United States Patent
Hagen et al.

(10) Patent No.: US 12,339,793 B2
(45) Date of Patent: Jun. 24, 2025

(54) METHOD AND APPARATUS FOR OPERATING A NUMBER OF IO-LINK DEVICES BY MEANS OF AN IO-LINK MASTER

(71) Applicant: Balluff GmbH, Neuhausen a.d.F. (DE)

(72) Inventors: Sebastian Hagen, Bempflingen (DE);
Ulrich Baur, Frickenhausen (DE);
Matthias Beyer, Reutlingen (DE);
Manuela Schmidt, Filderstadt (DE)

(73) Assignee: BALLUFF GMBH, Neuhausen ADF (DE)

( * ) Notice: Subject to any disclaimer, the term of this patent is extended or adjusted under 35 U.S.C. 154(b) by 141 days.

(21) Appl. No.: 18/232,021

(22) Filed: Aug. 9, 2023

(65) Prior Publication Data
US 2024/0054086 A1 Feb. 15, 2024

(30) Foreign Application Priority Data
Aug. 15, 2022 (DE) .......................... 102022120529.0

(51) Int. Cl.
*G06F 13/20* (2006.01)
(52) U.S. Cl.
CPC .......... *G06F 13/20* (2013.01); *G06F 2213/40* (2013.01)

(58) Field of Classification Search
CPC ...................................................... G06F 13/20
See application file for complete search history.

(56) References Cited

U.S. PATENT DOCUMENTS

| | | | |
|---|---|---|---|
| 2017/0317916 A1* | 11/2017 | Ozaki | H04L 43/0817 |
| 2019/0327662 A1* | 10/2019 | Franz | H04W 84/20 |
| 2020/0267540 A1* | 8/2020 | Tal | H04L 9/0894 |

* cited by examiner

*Primary Examiner* — David E Martinez
(74) *Attorney, Agent, or Firm* — GableGotwals

(57) ABSTRACT

Operating IO-Link system having wirelessly connected IO-Link masters and several IO-Link devices divided into groups wirelessly connected by control system, at least one master with different configurations, one master with first configuration to operate first group of devices; a first process loop connected between at least one master and first group devices, checking communication status of connected devices of first group; at least second process loop reading devices of first group, setting configuration values for operation of first group devices, at least one master with at least second configuration operates at least second group of devices; at least third process loop connected between at least one master and devices of at least second group devices, checking communication status of connected devices of at least second group devices; at least fourth process loop reading devices of at least second group, setting configuration values for operation of at least second group devices.

8 Claims, 4 Drawing Sheets

METHOD AND APPARATUS FOR OPERATING A NUMBER OF IO-LINK DEVICES BY MEANS OF AN IO-LINK MASTER

CROSS-REFERENCE TO RELATED APPLICATIONS

This United States application claims priority to German Patent Application No. DE 10 2022 120 529.0 filed 15 Aug. 2022, which is incorporated herein by reference.

The invention relates to the wireless transmission of data or information between IO-Link devices, in particular in an actuator/sensor arrangement of industrial actuators, sensors or a corresponding actuator/sensor hub that are wirelessly communication technologically connected with each other via an IO-Link, e.g. for monitoring the state of an industrial/technical device.

PRIOR ART

IO-Link systems are known, e.g. the "BIC" system of the present applicant, in which IO-Link devices communicate with each other through wired connections, whereby the IO-Link devices can only be dynamically swapped out or replaced with great technical effort.

Furthermore, IO-Link systems according to the new "IO-Link Wireless" standard that work wirelessly or without cables have already become known, e.g. according to the IO-Link specification "IO-Link Wireless System Extensions", Version 1.1, March 2018 (Order no. 10.112 in IO-Link Community, Karlsruhe, Germany, available via http://www.io-link.com/).

In the mentioned specification, a fixed radio connection between a wireless master ("W-Master") and one or more wireless devices ("W-Device"), i.e. one or more IO-Link devices(s) that are wirelessly integrated into the IO-Link system or connected to this, is described, whereby the swap or replacement of a W-device can only occur via an "unpairing" and "pairing" (see FIGS. 1 and 2A) in so far as no roaming mode is used.

The entire configuration of a corresponding w master therefore has to be carried out via a control system (e.g. a programmable logic controller "PLC") every time. This is, however, very complex for a w master with up to 40 w-ports (with 5 Tracks) and can therefore only be carried out very time-consumingly.

DISCLOSURE OF THE INVENTION

The present invention is therefore based on the following technical knowledge and problems resulting therefrom.

On the one hand, a w master of a wireless "IO-Link system" can only contain up to 5 transmission channels, of which every channel supports up to 8 w devices. A corresponding w master is therefore limited to the radio operation of only 40 w devices (see FIG. 2B).

Additionally, such a w master offers a fixed configuration, relative to which the individual w devices are permanently assigned. The entire configuration of the w master therefore has to be carried out via a control system, e.g. a PLC, every time. For a w master with up to 40 w ports (with 5 tracks) this would, however, only be able to be carried out with relatively great expenditure of time.

To address these problems as well as further problems described in the context of the present disclosure, the invention is based on the idea of dynamically switching mentioned configurations of IO-Link devices, e.g. by means of a control system, in a wireless IO-Link system, e.g. based on corresponding process data or based on acyclic services.

The possibility thereby arises of being able to address or control a significantly higher number of w devices compared to the prior art with only one w master. A single w master can therefore theoretically manage up to 1160 w devices, and indeed according to the relationship: 40 w devices×29 configurations=1160 w devices. These w devices can then be addressed one after the other in 40 w device units, in that the associated configuration loads e.g. by means of a control system.

The mentioned functionality offers a significant improvement for a user in e.g. the following use cases:
in high-bay warehouses, in which the stock status of the many shelves regularly needs to be queried;
during status monitoring (so-called "Condition Monitoring") of a number of devices to be monitored.

Furthermore, it is possible to dynamically adjust the w master to its respective application with this function. An application can therefore occur in the following use cases:
when changing facilities operated by means of an IO-Link system, wherein the w master can then be dynamically adjusted to the changes,
when using tools on industrial robots, wherein the w master stores a suitable configuration for every tool of the robot, which is then loaded during the respective tool change.

As already mentioned, according to the prior art, a mentioned dynamic swapping of devices or tools is only possible by means of the so-called "unpairing" and "pairing," wherein a part of the "wireless configuration" has to be changed in a disadvantageous manner.

The method according to the invention as well as the apparatus or the IO-Link system therefore enable a wireless or cable-less transmission of data/information between a number of participants (actuators, sensors, devices, tools, etc.), e.g. a number of participants larger than 120. Additionally, new applications are thus enabled based on a number of w devices connected to an IO-Link system.

In the method or apparatus suggested here, a serial operating mode of a w master involved here is suggested, wherein the w devices are serially processed by means of different configurations, which are stored on the w master. Per configuration, up to 40 w devices can hereby be connected via the IO-Link system. Each of these configurations has a different master ID, so that the connection of the affected w devices to the w master is always unique.

According to this IO-Link wireless standard, 29 different master IDs are additionally provided, with which 40×29=1160 w devices in total can therefore be addressed. The especial advantage is now that the configurations can be hot swapped or replaced by the control system without stopping operation.

It should however be noted that, according to the suggested method, the respective configuration also always has to be changed, which requires some time. The switching can last several seconds for every configuration. In the complete configuration of an IO-Link system affected here, switching the configuration requires about 3 s. It can therefore last up to 5 s, until all 40 w devices are synchronised with each other, until the w master is ready again after such a reconfiguration. If there are 29 available configurations, which should be activated after each other, 29×5 s=145 s (approx. 3 minutes) are therefore theoretically necessary. However, these configuration times are very hardware-dependent, whereby these can vary greatly and be both lower and higher.

By means of the suggested method and the apparatus, significantly more w devices can be used in a radio cell of a wireless IO-Link system than in the prior art. This is because, according to the underlying radio standard, it is not permitted to use more than 3 w masters in a single cell. It therefore follows that for the maximum number of possible w devices according to the prior art there are: 40 (w devices)×3 (w masters)=120 w devices. For non-time critical uses, it is, however, possible in principle to integrate, i.e. address or use, 40 (w device)×29 (configurations)×1 (w master)=1160 w devices into the IO-Link system with the suggested serial operating mode of the w master since such a serial operating mode only functions with a w master, since with two different w masters, which are using the same port, track and master ID, the w device cannot know which master it is connected with. Alternatively, 40 (w device)×(10 (configurations)×2 (w master)+9 (configurations)×1 (w master)) =1160 w devices can, however, also be provided.

With changes to the construction of the IO-Link system, the w master can additionally be dynamically adjusted to its respective use. Typically, the w master has a fixed configuration and has permanently assigned w devices for this configuration.

Since the suggested approach only represents one novel function or functionality, which can be used in the w master, the w master can also be operated without switching the configurations in time-critical uses.

However, the already-mentioned restriction arises if the configuration should be dynamically changed. Switching between the configurations can therefore last several seconds, wherein, in this timespan, the connections to the w devices are also interrupted.

It should further be mentioned, that the "data storage" function cannot be used to its full extent in the suggested approach. Furthermore, it must be ensured, when there are several w masters assigned to a single radio cell, that every w master has a unique master ID at all times. This is because, if the same master ID were to be used by two w masters one after the other, this would lead to a w device automatically connecting with the other w master, since the w device cannot differentiate which w master is involved.

According to a first aspect of the method according to the invention for operating an IO-Link system having at least one wirelessly connected IO-Link master and a number of wirelessly connected IO-Link devices by means of a control system, wherein the number of IO-Link devices is divided into at least two groups of IO-Link devices and wherein the at least one IO-Link master can be configured with at least two different configurations, the following process steps are provided:

configuring the at least one IO-Link master with a first configuration to operate the first group of IO-Link devices;

by means of a first process loop: producing a connection between the at least one IO-Link master and the IO-Link devices of the first group of IO-Link devices as well as checking the communication status of the IO-Link devices of the first group of IO-Link devices that are connected in this way;

by means of an at least second process loop: reading out the IO-Link devices of the first group and setting configuration values necessary for the operation of the IO-Link devices of the first group;

configuring the at least one IO-Link master with an at least second configuration to operate the at least second group of IO-Link devices;

by means of an at least third process loop: producing a connection between the at least one IO-Link master and the IO-Link devices of the at least second group of IO-Link devices as well as checking the communication status of the IO-Link devices of the at least second group of IO-Link devices that are connected in this way; and by means of an at least fourth process loop: reading out the IO-Link devices of the at least second group of IO-Link devices and setting configuration values necessary for the operation of the IO-Link devices of the at least second group.

According to a second aspect of the method according to the invention, it can be provided that when producing a connection between the at least one IO-Link master and the IO-Link devices of the first and the at least second group, respective waiting loops are provided. The waiting loops can thereby preferably be carried out for at least 1 s.

According to a further aspect of the method according to the invention, it can further be provided that when setting the configuration values necessary for the operation of the IO-Link devices of the first and the at least second group, a corresponding process order is initially sent from the control system to the IO-Link master and is forwarded from the IO-Link master to the presently affected IO-Link devices of the at least two groups.

According to a further aspect of the method according to the invention, it can be provided that the at least one IO-Link master can be configured with at least 29 different configurations.

According to yet a further aspect of the method according to the invention, it can further be provided that the number of IO-Link devices corresponds to a plurality of at least 1160 devices, wherein the last three process steps according to claim 1 can be carried out again regarding further groups of IO-Link devices.

The invention also relates to a control system, in particular a programmable logic controller, which is configured for carrying out the method according to the invention.

According to a first aspect of the apparatus according to the invention having at least one wirelessly connected IO-Link master and a number of wirelessly connected IO-Link devices as well as a control system, wherein the number of IO-Link devices is divided into at least two groups of IO-Link devices and wherein the at least one IO-Link master can be configured with at least two different configurations, it is in particular provided that the control system is configured to carry out the following process steps:

configuring the at least one IO-Link master with a first configuration to operate the first group of IO-Link devices;

by means of a first process loop: producing a connection between the at least one IO-Link master and the IO-Link devices of the first group of IO-Link devices as well as checking the communication status of the IO-Link devices of the first group of IO-Link devices that are connected in this way;

by means of an at least second process loop: reading out the IO-Link devices of the first group and setting configuration values necessary for the operation of the IO-Link devices of the first group;

configuring the at least one IO-Link master with an at least second configuration to operate the at least second group of IO-Link devices;

by means of an at least third process loop: producing a connection between the at least one IO-Link master and the IO-Link devices of the at least second group of IO-Link devices as well as checking the communication status of the IO-Link devices of the at least second group of IO-Link devices that are connected in this way; and by means of an at least fourth process loop: reading out the IO-Link devices of the at least second group of IO-Link devices and setting configuration values necessary for the operation of the IO-Link devices of the at least second group.

According to a further aspect of the method according to the invention, it can further be provided that the at least one IO-Link master can be configured with at least 29 different configurations.

The suggested method or apparatus enable, on the one hand, a larger flexibility regarding the application of an existing actuator system/sensor system or other equipment and, on the other hand, a significantly simpler control of mentioned actuator/sensor configurations. Significantly more actuator/sensor data can thereby additionally be gathered or significantly more actions can be carried out. Additionally, non-time-critical applications with a plurality of w devices are enabled, which, without the suggested approach, could only be implemented with relatively high effort on the part of a user.

With the suggested additional functionality of an IO-Link system involved here, a w master involved here can be used in additional areas of application. Furthermore, significantly more actuators or sensors or corresponding IO-Link sensor/actuator hubs can be used with a single w master.

The suggested additional functionality therefore advantageously enables or supports e.g. the following application:

using significantly more w devices;

with changes to the construction, the w master can be dynamically adapted to its usage. Typically, the w master has a fixed configuration and has permanently assigned w devices for this configuration;

more flexibility, simple control of the configurations, significantly more data can be collected or significantly more actions can be carried out;

non-time-critical applications are enabled with several w devices, which, without this solution, could not be implemented without an increased effort on the part of the customer's control system;

extension by means of RFID tags (e.g. on the tool) and automatic loading of the configuration.

In the additional functionality, there are only restrictions if an IO-Link configuration were to be dynamically changed, since the switching between the configurations can last several seconds, wherein, in this timespan, the connections to the w devices are also interrupted. The IO-Link data storage function can also not be used to its full extent.

Additionally, when there are several w masters in a cell, it must be ensured that every w master has a unique master ID at all times.

SHORT DESCRIPTION OF THE DRAWINGS

Exemplary embodiments of the invention are represented in the drawings and are described in more detail in the following description.

EXEMPLARY EMBODIMENTS OF THE INVENTION

Figure 1:
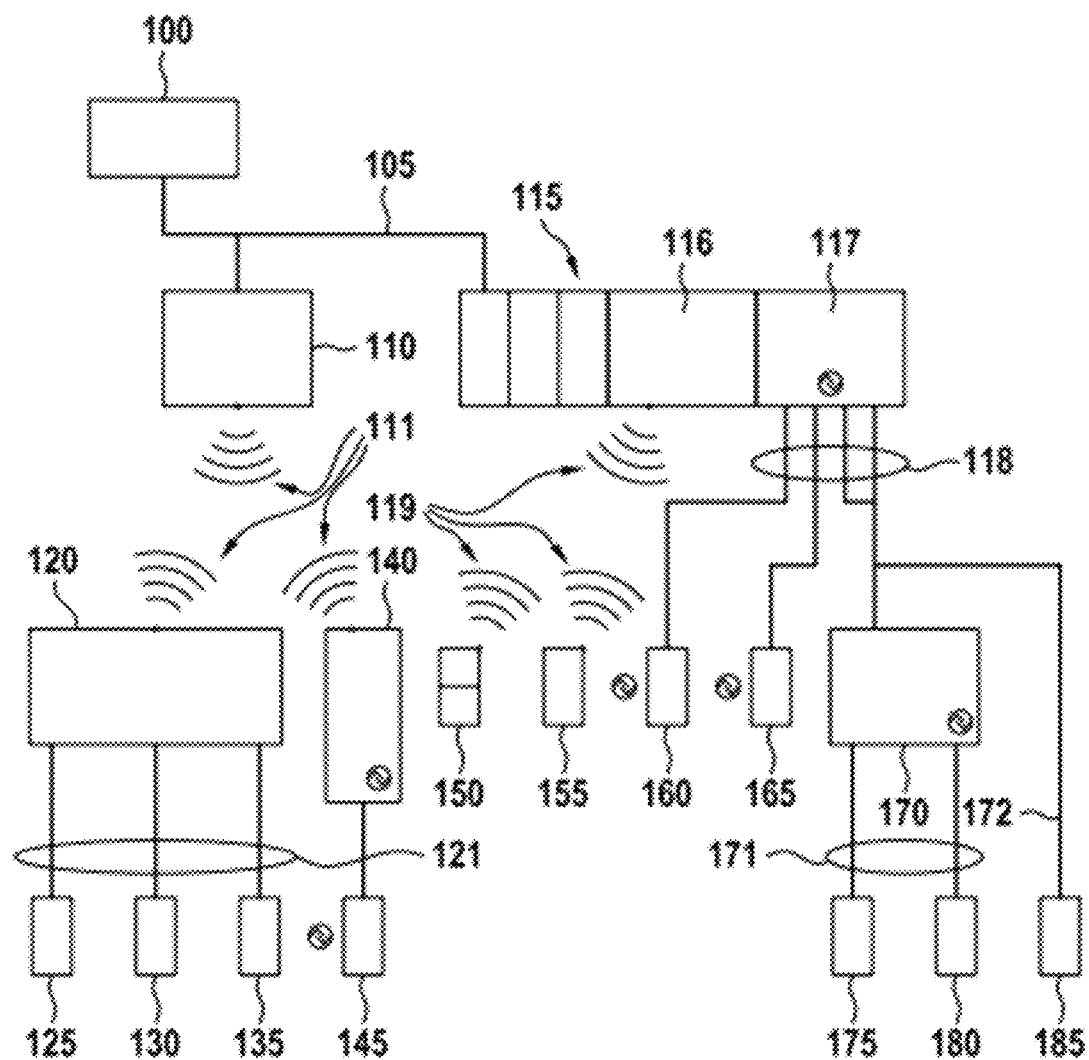
FIG. 1 shows an actuator/sensor arrangement according to the prior art, which is wirelessly connected to a programmable logic controller (PLC) via an IO-Link system.

The actuator/sensor arrangement according to the prior art that is schematically represented in FIG. 1 using a block diagram comprises a programmable logic controller PLC 100, which is connected with an IO-Link system that is involved here via an industrial fieldbus 105 (e.g.: interbus, profibus, HART, bitbus, I2C bus, modbus, LIN bus, MOST bus, IDB-1394, TTP/A bus, TTP/C bus, BACnet, batibus, VARAN bus, and the CAN bus, or a fieldbus based on the IP protocol via ethernet) that is known in itself.

The IO-Link system comprises a wireless IO-Link master ("w master") 110 in the present exemplary embodiment, as well as further remote IO-Link masters 115, including a wirelessly functioning w master 116 as well as a wired IO-Link master 117, which are communication or data technologically connected or coupled with the PLC 100 via the fieldbus 105.

Via a wireless connection or radio connection 111 of the w master 110, a wirelessly functioning IO-Link device, in the present exemplary embodiment a wirelessly functioning IO-Link hub 120, is communication or data technologically connected with the w master 110. Standard sensors or actuators 125, 130, 135, i.e. that are purely wired and not IO-Link enabled, are connected with the IO-Link hub 120 by means of corresponding wired communication or data connections 121. An IO-Link enabled sensor or actuator 145 is connected by means of a wirelessly functioning communication bridge 140 that is also coupled by means of the radio connection 111.

Two wirelessly functioning and IO-Link enabled sensors or actuators 150, 155 are integrated by means of a radio connection 119 provided by the w master 116.

Two IO-Link enabled sensors or actuators 160, 165 are further integrated by means of a purely wired connection 118 provided by the IO-Link master 117. Additionally, a correspondingly wired IO-Link hub 170 as well as an IO-Link enabled sensor or actuator 185 that is directly connected by means of the wired connection 172 are integrated into the IO-Link system by means of the wired connection 118 of the IO-Link master 117. Two further IO-Link enabled sensors or actuators 175, 180 are further integrated into the IO-Link system by means of the wired connection 171 provided by the IO-Link hub 170, in order to eventually also be communication or data technologically connected with the PLC 100.

Figure 2A:
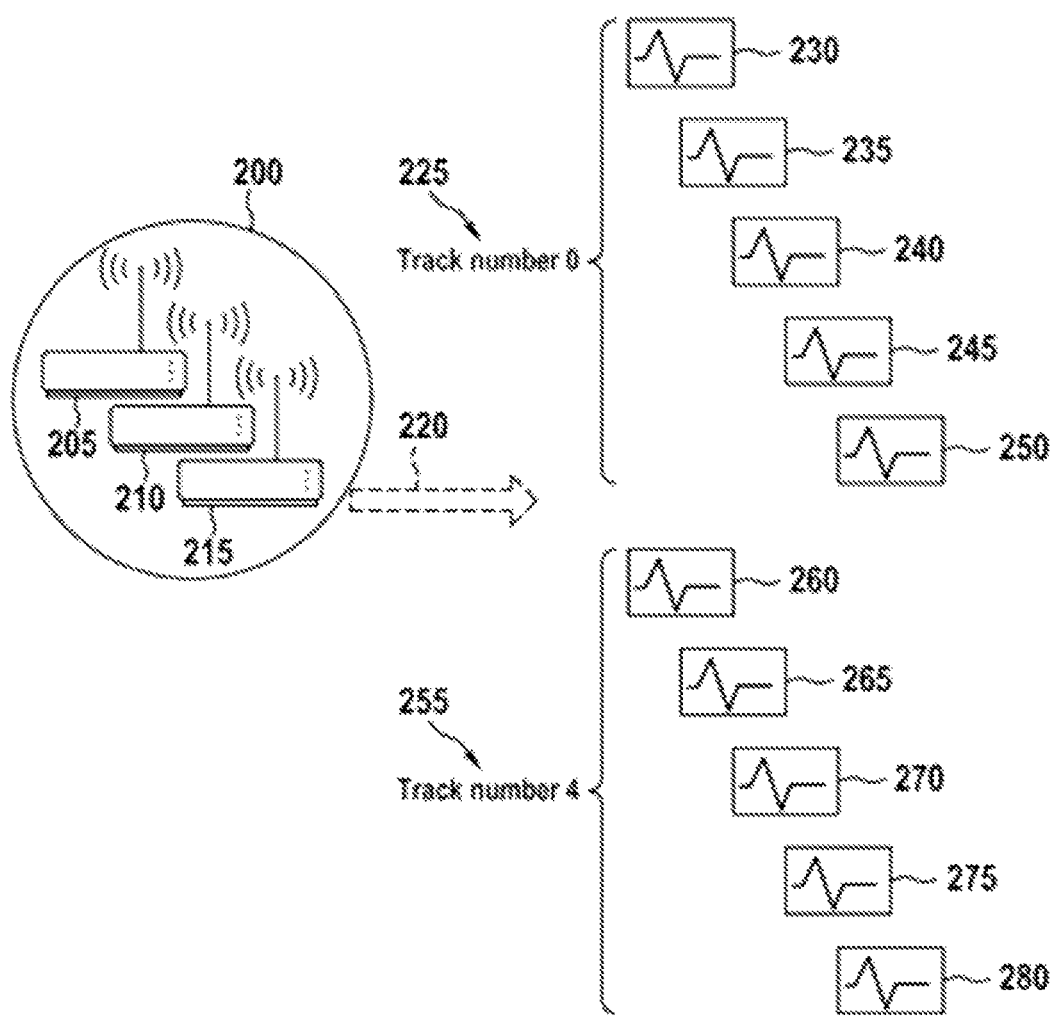
FIG. 2A shows an exemplary w master cell here with three wireless IO-Link w master devices as well as a corresponding communication distribution scheme, according to the invention.

An IO-Link w master cell 200 schematically shown in FIG. 2A comprises three wireless IO-Link w master devices 205, 210, 215. Indeed, the three w masters 205-215 correspond to the IO-Link w master devices 110 or 116 described in FIG. 1 in their technical construction, however they differ from these in their functionality or in their operating mode as follows.

A different distribution scheme is provided for the communication with IO-Link devices compared to the described prior art. This distribution scheme is based on the following procedure described on the basis of FIG. 3.

All of the three w masters 205-215 shown on the left side of FIG. 2A each thereby support five communication channels (or communication tracks), wherein overall, i.e. by means of the five channels, forty IO-Link devices can be integrated 220 into an IO-Link system shown in FIG. 1.

On the right side of FIG. 2A, two channels are illustratively shown, specifically the first of the five channels or the track with the logical number "0" as well as the last of the five channels with the logical number "4". The IO-Link devices (w devices) 230, 235, 240, 245 and 250 are presently integrated into the IO-Link system via the first channel "0" and the IO-Link devices 260 265, 270, 275 and 280, via the shown second channel "4". The same applies for the channels not shown here.

Figure 2B:
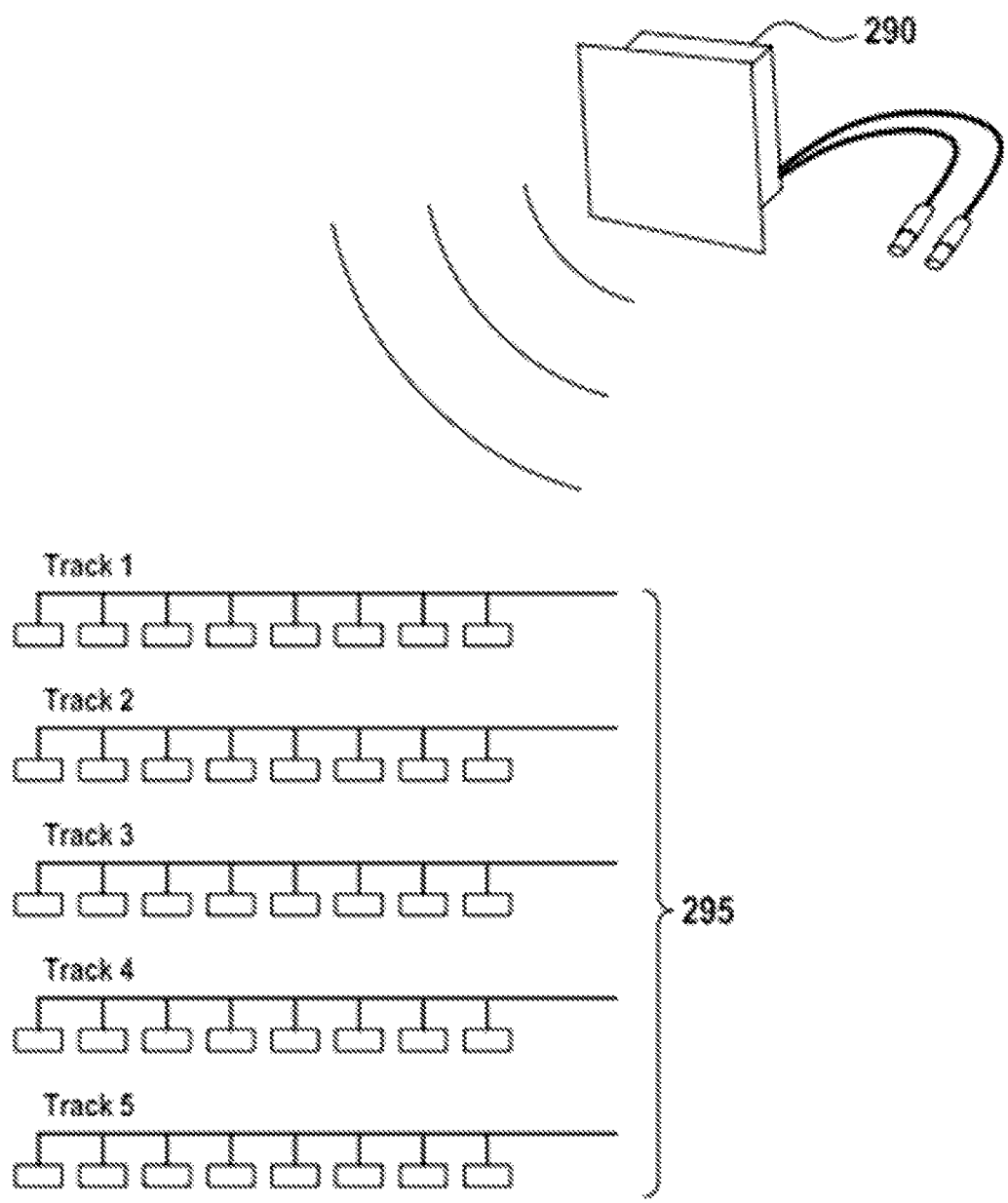
FIG. 2B shows a typical track distribution of a single w master device shown in FIG. 2A.

The IO-Link w master 290 shown in FIG. 2B enables the connection of the already-mentioned forty w devices via the five channels or tracks 295 shown there in a configuration.

On the basis of the serial reconfiguration of the w master 290 according to the invention, wherein the w devices are activated one after the other or in series, up to 40×29=1160 w devices can be integrated into such an IO-Link system with the w master 290 if there are 29 different available configurations. This number of addressable w devices, which is dependent on the number of possible configurations of the w master 290, can therefore correspondingly increase even further if there are still more available configurations.

Figure 3:
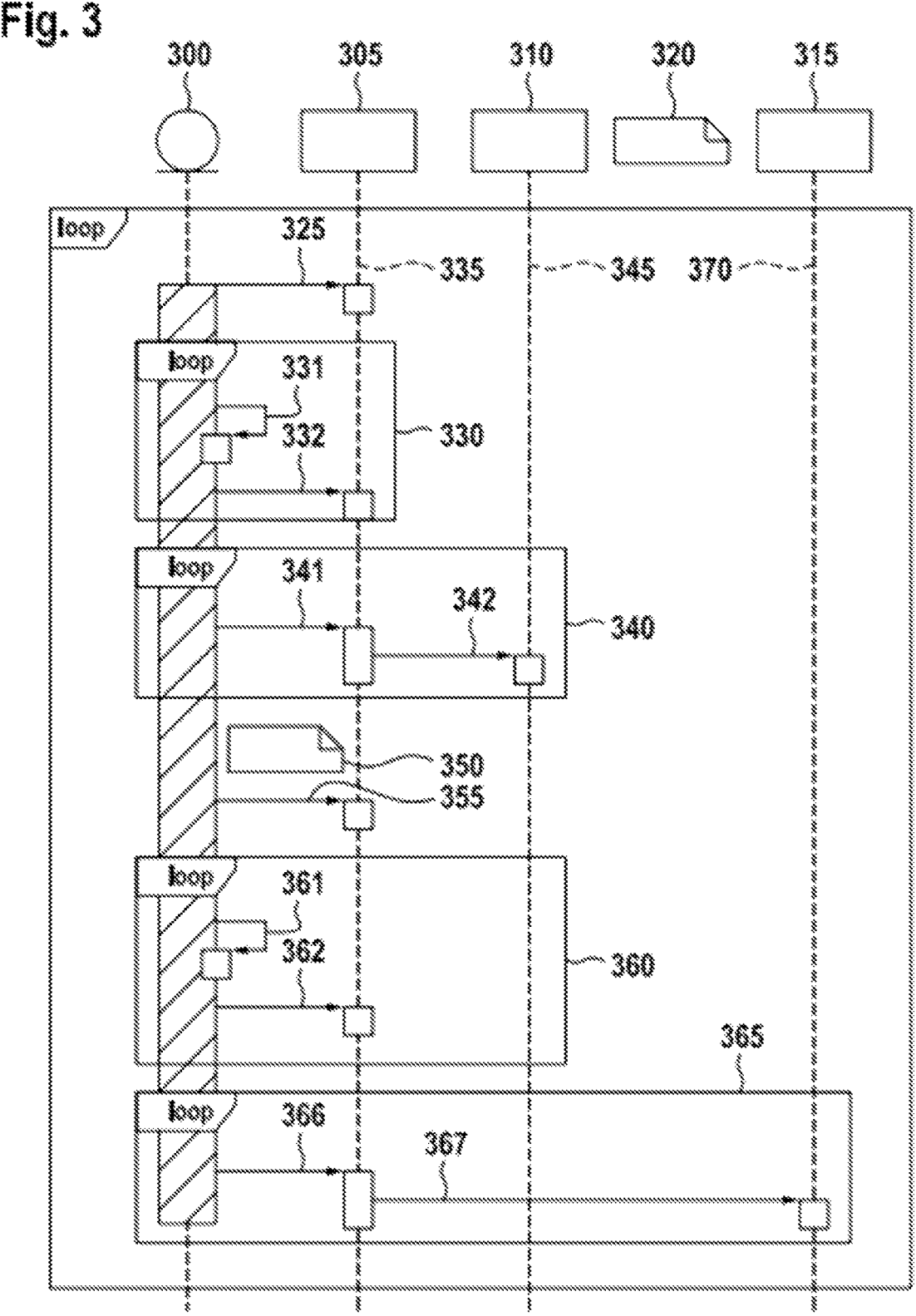
FIG. 3 shows an exemplary embodiment of the method according to the invention of the serial operating mode of a w master device with a plurality of w devices involved here, based on a flow or sequence diagram.

In FIG. 3, the method according to the invention for the serial operation of a w master 305 involved here, by means of a programmable logical controller (PLC) 300 in the present exemplary embodiment, is represented based on a flow or sequence diagram if there is a plurality of w devices 310-320.

The plurality of w devices 310-320 is divided into groups 295 each of 40 w devices according to FIG. 2B, i.e. here into the two explicitly shown groups of w devices (1-40) 310 and w devices (1121-1160) 315. The further w devices (41-1120) 320 only represented as dotted lines correspond to the remaining w devices, which can be addressed or controlled using the w master 305 in 29 different available configurations.

The whole process sequence shown initially begins with a first configuration 325 of the w master 305 by means of the PLC 300, in order to activate the configuration of the first group 310 of w devices (1-40) in the present exemplary embodiment.

During a first process loop 330 taking place afterwards in the PLC 300, a communication or data connection with the initially addressed w devices (1-40) is produced. In order to ensure this, a waiting loop 331 of, in this exemplary embodiment, 1 s occurs. At the end of the process loop 330, the w master 305 is asked 332 by the PLC 300 for the finally resulting communication status of the w devices (1-40) involved.

Should the connection to the initially addressed w devices (1-40) 310 still not be produced, then the process loop 330 is repeated.

During a second process loop 340 taking place afterwards in the PLC 300, the w devices (1-40) 310 involved in the first process loop 330 are read out and configuration values necessary for further operation are set on them. The corresponding process order is thereby initially provided 341 to the w master 305 by the PLC 300 and is forwarded 342 from the w master 305 to the presently involved w devices (1-40).

As is shown by dotted lines 350, further corresponding process loops can be provided for the further configuration of the further w devices (41-1120) 320, which are also only represented by dotted lines.

In the further process step 355, the renewed configuration of the w master 305 occurs by means of the PLC 300, in order to activate the configuration of the second group 315 of w devices (1121-1160) in the present exemplary embodiment.

A further process loop 360 then occurs, corresponding to the first process loop 330, in which a communication or data connection is in turn produced with the now presently involved w devices (1121-1160) 315. In order to ensure this, a waiting loop 361 of, in this exemplary embodiment, 1 s occurs as well. At the end of this process loop 360, the w master 305 is asked 362 by the PLC 300 for the finally resulting communication status of the w devices (1121-1160) presently involved.

Should the connection to the now presently addressed w devices (1121-1160) 315 still not be produced, then the process loop 360 is repeated.

During yet another process loop 365 taking place afterwards in the PLC 300, the w devices (1121-1160) 315 involved in the previous process loop 330 are here read out and configuration values necessary for their further operation are set on them. The corresponding process order is thereby initially provided 366 to the w master 305 by the PLC 300 and is in turn forwarded 367 from the w master 305 to the presently involved w devices (1121-1160).

For the described method as well as the apparatus, there are now a plurality of possible applications or fields of use.

By means of the method or the apparatus, the status of a plurality of shelves in a high-bay warehouse can therefore be regularly queried. The w master should thereby be arranged as centrally as possible in the high-bay warehouse, so that it can maximally illuminate every spatial direction. A single w master can thereby request the status of up to 1160 shelves.

"Condition Monitoring" can also be carried out for a plurality of devices to be monitored by means of the method or the apparatus. Since condition monitoring often does not involve time-critical data, a large amount of data can be collected with only one w master, with the described approach.

Further, an industrial robot with a plurality of interchangeable heads or tools can be operated by means of the method or the apparatus. Such a robot uses different tools, wherein every tool has different sensors or actuators. With the described approach, an individual configuration can be stored for every robotic tool and this can then be loaded in the operation of the robot in the w master.

The invention claimed is:

1. Method for operating by means of a control system (300) an IO-Link system having at least one wirelessly connected IO-Link master (305) and a number of wirelessly connected IO-Link devices (310-320) being divided into at least two groups (310, 315), the at least one IO-Link master (305) capable of being configured with at least two different configurations, the method comprising the following steps:
   configuring the at least one IO-Link master (305) with a first configuration (325) to operate the first group (310) of IO-Link devices;
   by means of a first process loop (330), producing a connection between the at least one IO-Link master (305) and the IO-Link devices of the first group (310)

of IO-Link devices as well as checking (332) a communication status of the IO-Link devices of the first group (310) of IO-Link devices that are connected in this way;

by means of an at least second process loop (340), reading out the IO-Link devices of the first group (310) and setting configuration values necessary for operation of the IO-Link devices of the first group (310);

configuring the at least one IO-Link master (305) with an at least second configuration (355) to operate the at least second group (315) of IO-Link devices;

by means of an at least third process loop (360), producing a connection between the at least one IO-Link master (305) and the IO-Link devices of the at least second group (315) of IO-Link devices as well as checking (362) a communication status of the IO-Link devices of the at least second group (315) of IO-Link devices that are connected in this way; and by means of an at least fourth process loop (365), reading out the IO-Link devices of the at least second group (315) of IO-Link devices and setting configuration values necessary for operation of the IO-Link devices of the at least second group (310).

2. Method according to claim 1, wherein when producing a connection between the at least one IO-Link master (305) and the IO-Link devices of the first and the at least second group (310, 315), waiting loops (331, 361) are provided.

3. Method according to claim 1, wherein when setting the configuration values necessary for the operation of the IO-Link devices of the first and the at least second group (310, 315), a corresponding process order is initially sent (341, 366) from the control system (300) to the IO-Link master (305) and is forwarded (342, 367) from the IO-Link master (305) to the presently affected IO-Link devices of the at least two groups (310, 315).

4. Method according to claim 3, wherein the at least one IO-Link master (305) capable of being configured with at least 29 different configurations.

5. Method according to claim 4, wherein a number of IO-Link devices corresponds to a plurality of at least 1160 devices (310-320), and wherein the following steps are carried out again regarding further groups (320) of IO-Link devices:

configuring the at least one IO-Link master (305) with an at least second configuration (355) to operate the at least second group (315) of IO-Link devices;

by means of an at least third process loop (360), producing a connection between the at least one IO-Link master (305) and the IO-Link devices of the at least second group (315) of IO-Link devices as well as checking (362) a communication status of the IO-Link devices of the at least second group (315) of IO-Link devices that are connected in this way; and by means of an at least fourth process loop (365), reading out the IO-Link devices of the at least second group (315) of IO-Link devices and setting configuration values necessary for operation of the IO-Link devices of the at least second group (310).

6. Method according to claim 1 comprising a control system (300), configured for operating the IO-Link system.

7. IO-Link apparatus comprising at least one wirelessly connected IO-Link master (305) and a control system (300) including non-transitory machine readable medium containing instructions, wherein the at least one IO-Link master (305) can be configured with at least two different configurations, the instructions, when executed by the control system, carry out the following process steps:

configure the at least one IO-Link master (305) with a first configuration (325) to operate a first group (310) of IO-Link devices in wireless communication with the at least one IO link master (305);

operate a first process loop (330), the first process loop (330) producing a connection between the at least one IO-Link master (305) and the IO-Link devices of the first group (310) of IO-Link devices as well as checking (332) a communication status of the number of IO-Link devices of the first group (310) of IO-Link devices;

operate at least a second process loop (340), the second process loop (340): reading out the IO-Link devices of the first group (310) and setting configuration values necessary for operation of the IO-Link devices of the first group (310);

configure the at least one IO-Link master (305) with an at least second configuration (355) to operate at least a second group (315) of IO-Link devices;

operate at least a third process loop (360), the third process loop (360) producing a connection between the at least one IO-Link master (305) and the IO-Link devices of the at least second group (315) of IO-Link devices as well as checking (362) a communication status of the IO-Link devices of the at least second group (315) of IO-Link devices; and operate at least a fourth process loop (365), the fourth process loop (365) reading out the IO-Link devices of the at least second group (315) of IO-Link devices and setting configuration values necessary for operation of the IO-Link devices of the at least second group (310).

8. IO-Link apparatus according to claim 7, wherein the at least one IO-Link master (305) being configured with at least 29 different configurations.

* * * * *